United States Patent
Gillay et al.

(10) Patent No.: US 9,248,722 B2
(45) Date of Patent: Feb. 2, 2016

(54) HOUSING ASSEMBLY FOR A VEHICLE DOOR HANDLE

(71) Applicant: Toyota Motor Engineering & Manufacturing North America, Inc., Erlanger, KY (US)

(72) Inventors: Daniel F. Gillay, Plymouth, MI (US); Que-Whang Rhee, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/249,911

(22) Filed: Apr. 10, 2014

(65) Prior Publication Data

US 2015/0291010 A1    Oct. 15, 2015

(51) Int. Cl.
*B60J 5/00* (2006.01)
*B60J 5/04* (2006.01)
*E05B 85/02* (2014.01)
*E05B 85/12* (2014.01)

(52) U.S. Cl.
CPC .............. *B60J 5/0416* (2013.01); *E05B 85/02* (2013.01); *E05B 85/12* (2013.01)

(58) Field of Classification Search
CPC .. Y10T 292/57; B60R 13/0243; B60J 5/0416; E05B 85/02; E05B 85/12
USPC .................... 296/146.7, 1.08; 292/336.3, 347
See application file for complete search history.

(56) References Cited

U.S. PATENT DOCUMENTS

| | | | |
|---|---|---|---|
| 5,377,450 A * | 1/1995 | Varajon ........................ | 49/502 |
| 5,413,391 A | 5/1995 | Clavin et al. | |
| 5,895,081 A | 4/1999 | Tanimoto et al. | |
| 6,059,329 A | 5/2000 | Spitzley | |
| 8,220,848 B2 | 7/2012 | Minemura et al. | |
| 8,408,611 B2 | 4/2013 | Takagai et al. | |
| 2004/0212215 A1* | 10/2004 | Minemura et al. ......... | 296/146.7 |
| 2006/0163908 A1* | 7/2006 | Guanzon et al. ........... | 296/146.7 |
| 2008/0022602 A1 | 1/2008 | Senoo | |
| 2011/0175377 A1 | 7/2011 | Tanaka et al. | |
| 2013/0168980 A1 | 7/2013 | Minemura | |

FOREIGN PATENT DOCUMENTS

JP    02129559 U    10/1990

* cited by examiner

*Primary Examiner* — Joseph D Pape
(74) *Attorney, Agent, or Firm* — Dinsmore & Shohl LLP (57) ABSTRACT

A housing assembly is provided. The housing assembly may be used in an automotive vehicle. The housing assembly includes a trim piece and a base. The trim piece is configured to engage the interior trim panel and attach to the base. The base is attached to the trim piece wherein the attachment to the trim piece is weaker than the attachment of the trim piece to the interior panel so as to allow the trim piece to separate from the base before the trim piece separates from the interior trim panel. The housing assembly may further include a pair of spacers configured to maintain a spatial relationship between a first side wall and a second side wall so as to prevent the first and second side walls from squeezing inwardly with respect to each other when the trim piece is displaced from the base.

12 Claims, 7 Drawing Sheets

HOUSING ASSEMBLY FOR A VEHICLE DOOR HANDLE

FIELD OF THE INVENTION

The invention relates to a housing assembly having a trim piece and a base. In particular, the housing assembly is configured to house a door handle. A portion of the door handle is mounted to a structural frame. The trim piece is configured to engage an interior trim panel and the base is attached to the structural frame. The attachment of the base to the trim piece is weaker than the attachment of the trim piece to the interior panel. Accordingly, the housing assembly is configured such that the trim piece separates from the base before the trim piece separates from the interior panel wherein the door handle may remain in a fixed relationship with the structural frame.

BACKGROUND OF THE INVENTION

Door assemblies for use in automotive vehicles include an exterior panel, a vehicle frame, and an interior trim panel. The interior trim panel includes a door housing. The door housing is formed in one piece and includes an opening. The opening is configured to receive a stem of a door handle. The stem is mounted through the opening and attached to the vehicle frame. A cable support may be sandwiched in between the housing assembly and the vehicle frame. Displacement of the interior trim panel may warp the housing assembly. Accordingly, it remains desirable to have a housing assembly formed of two pieces wherein a first piece may move with the displacement of the interior trim panel and the attachment of the handle to the vehicle frame is not disturbed.

SUMMARY OF THE INVENTION

According to one aspect of the invention a housing assembly is provided. The housing assembly includes a trim piece and a base. The housing assembly may be mounted to a structural frame, such as the vehicle body of an automotive vehicle. The housing assembly is configured to house a door handle. The door handle is mounted to the vehicle body. The base is configured to attach to the vehicle body. The trim piece is configured to attach to both an interior trim panel of the door assembly and the base.

The trim piece has a first wall bounding a space. The space is configured to hold the door handle. The trim piece includes at least two attachments. One of the attachments is configured to engage the trim piece with the interior trim panel. Another attachment is configured to engage the trim piece with the base.

The base includes a handle support and a second wall. The handle support is a generally planar surface. The second wall extends outwardly from the peripheral edge of the handle support. The base includes an open side defined by a distal edge of the second wall and the handle support. The handle support includes an opening for receiving a portion of the door handle.

The base includes an attachment configured to engage the trim piece wherein the attachment between the trim piece and the base is weaker than the attachment between the trim piece and the interior trim panel. Accordingly, the trim piece may separate from the base before the trim piece separates from the interior trim panel.

The trim piece may further include a pair of spacers. Each of the spacers is spaced apart and opposite from each other. One of the spacers is mounted to a first side wall of the trim piece. The other of the spacers is mounted to a second side wall of the trim piece. The spacers extend beyond the distal edges of a respective first and second side wall.

The base includes a pair of cages formed adjacent the open sides of the base. The cages may be formed on opposite sides of the second wall. The cages have an elongated slot configured to engage the spacer so as to hold the spacers in a fixed relationship with respect to each other as the spacers slide within the slot.

An insert is disposed within the door housing. The insert is mounted onto the handle support and covers a bottom opening. The insert is configured to hide a part line. Accordingly, the spacers maintain the spatial relationship between first and second side walls as the trim piece is displaced from the base so as to keep the insert in a fixed relationship with the base.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
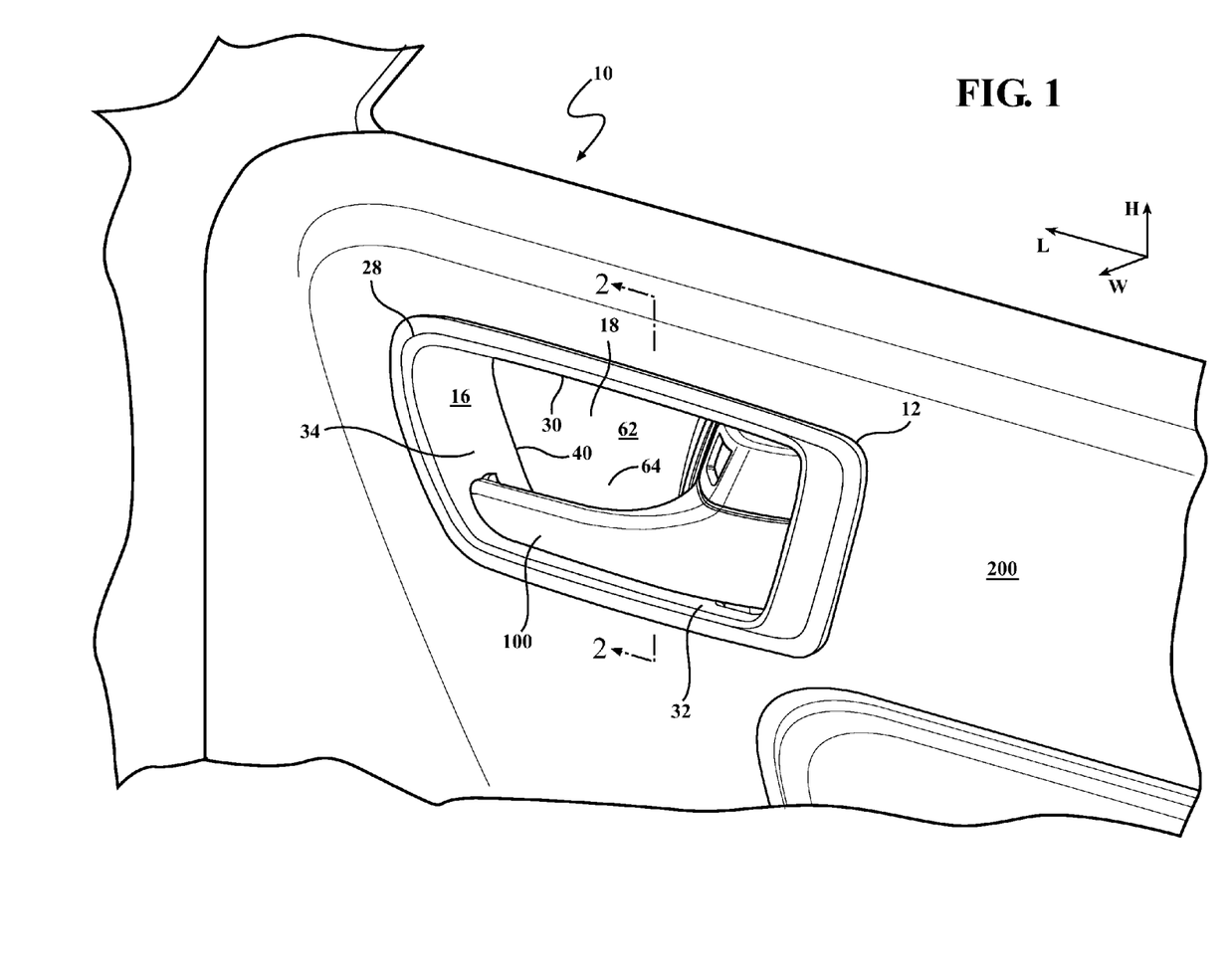
FIG. 1 is a perspective view showing the housing assembly mounted to an interior trim panel of a vehicle door assembly.

With reference first to FIG. 1, an illustrative view of the housing assembly 10 is provided. The housing assembly 10 includes a trim piece 12 and a base 14. The base 14 and the trim piece 12 may be an injection molded piece formed from a polypropylene. The housing assembly 10 is configured to hold a door handle 100 and may be mounted to an interior trim panel 200 of a door assembly. The door assembly may be mounted to an automotive vehicle. The door handle 100 is mounted to a structural frame, such as the vehicle body 300 of an automotive vehicle.

Figure 2:
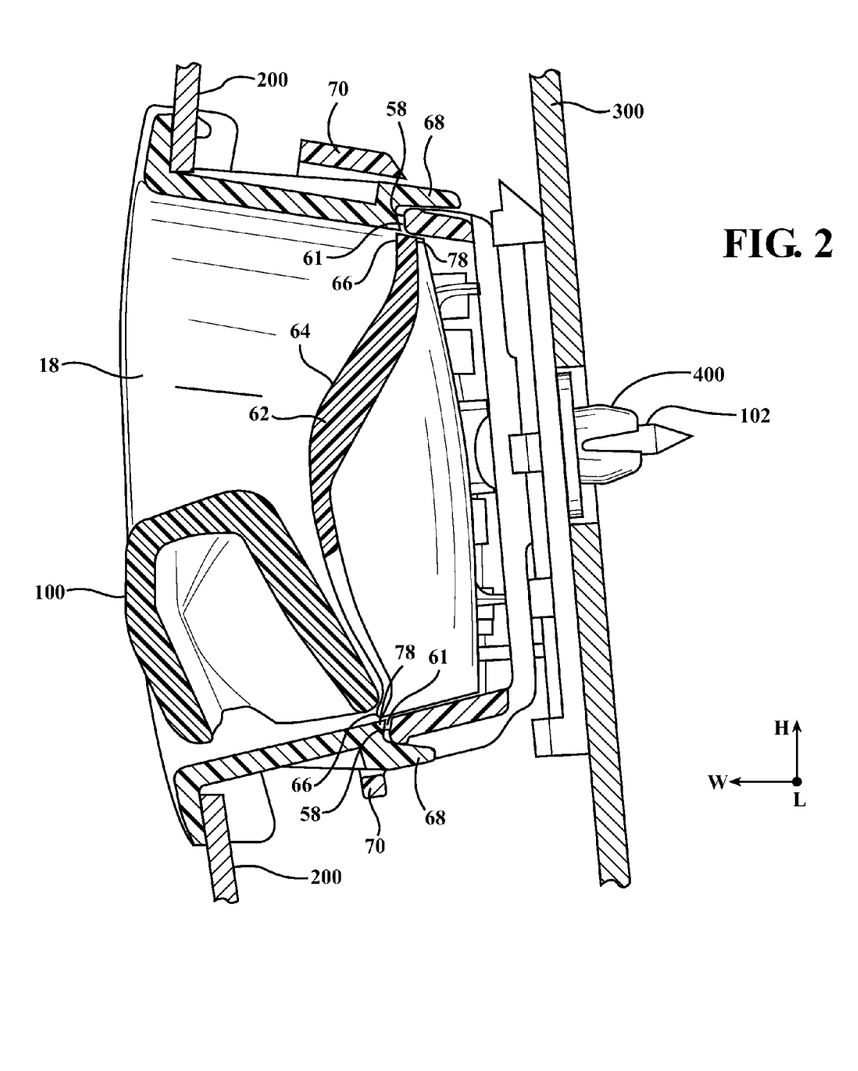
FIG. 2 is a cross section of FIG. 1 taken along lines 2-2.
Figure 3:
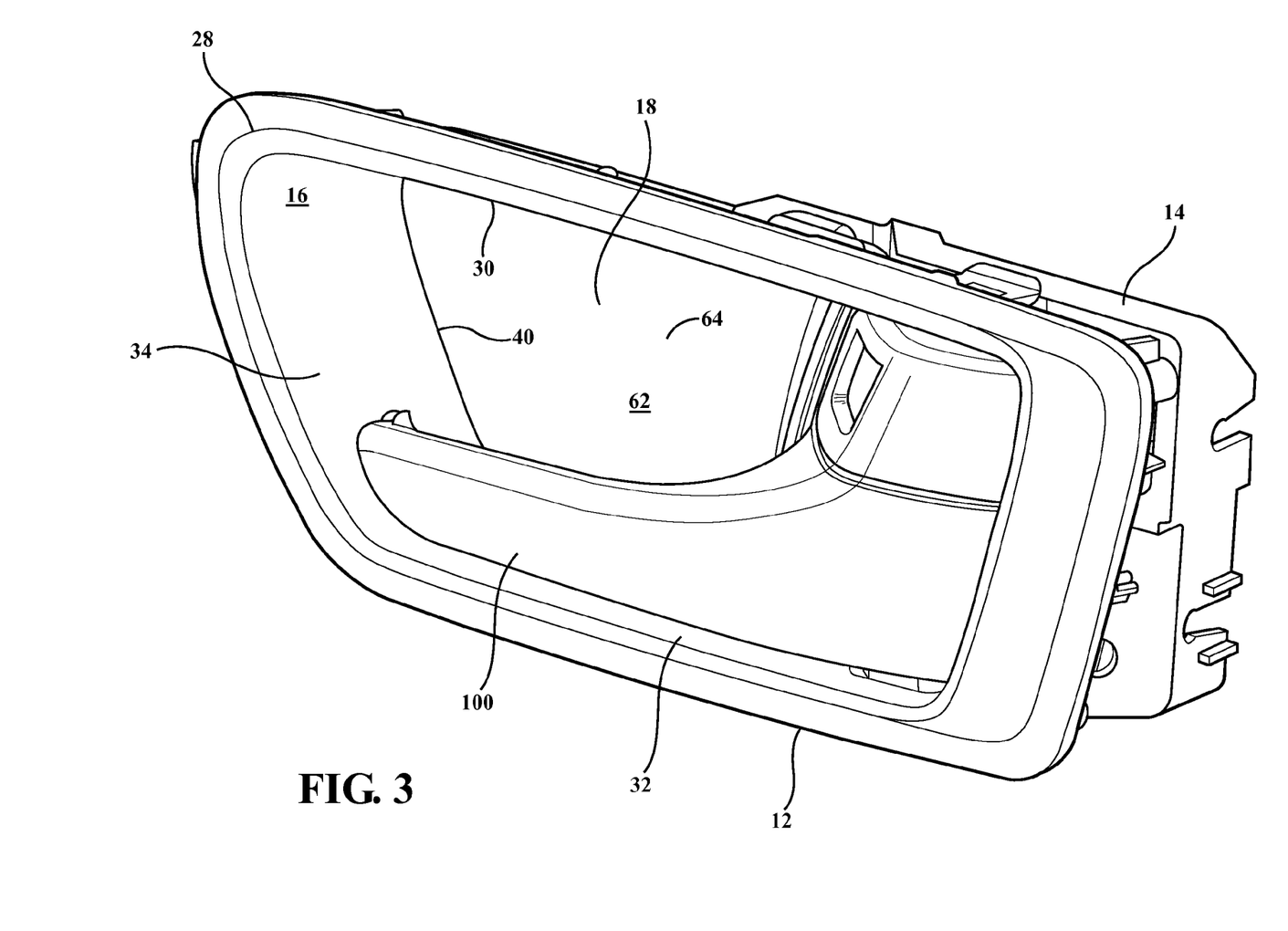
FIG. 3 is a perspective view of the housing assembly.
Figure 4:
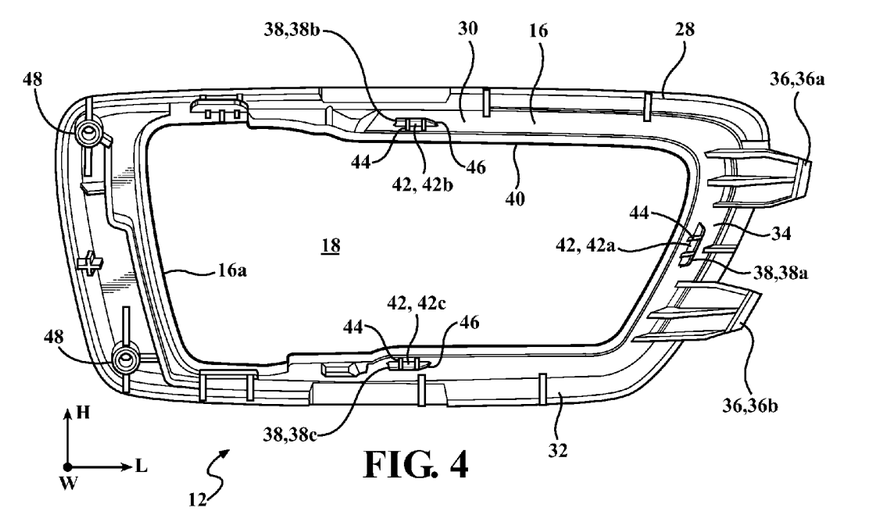
FIG. 4 is a view of the front wall of the trim piece.

With reference again to FIG. 1 and now to FIGS. 2, 3, and 4, the trim piece 12 is generally flush with an outer surface of the interior trim panel 200 of the door assembly. The trim piece 12 includes a first wall 16 bounding a space 18 configured to hold the door handle 100. The first wall 16 extends inwardly so as to define a space 18 which is recessed with respect to the interior trim panel 200.

Figure 5:
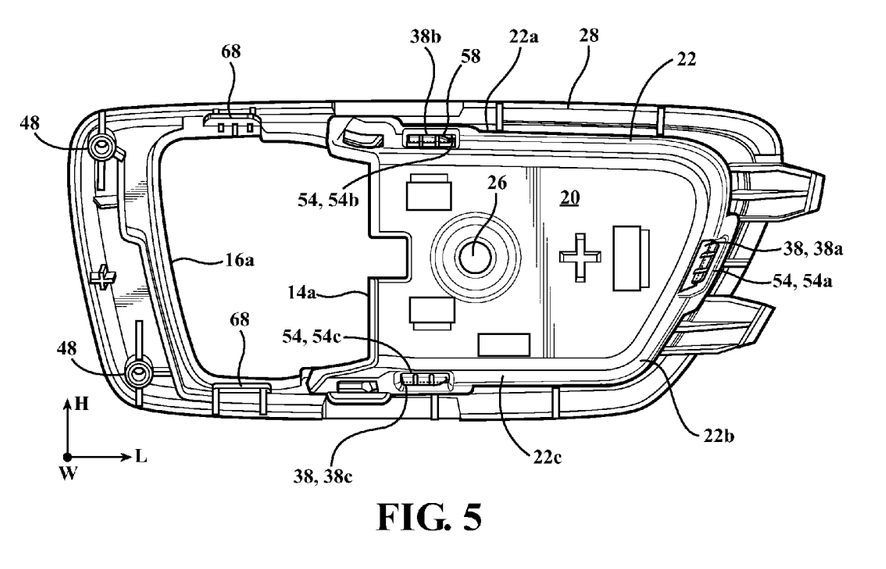
FIG. 5 is a top down view of the base mounted to the trim piece.
Figure 7:
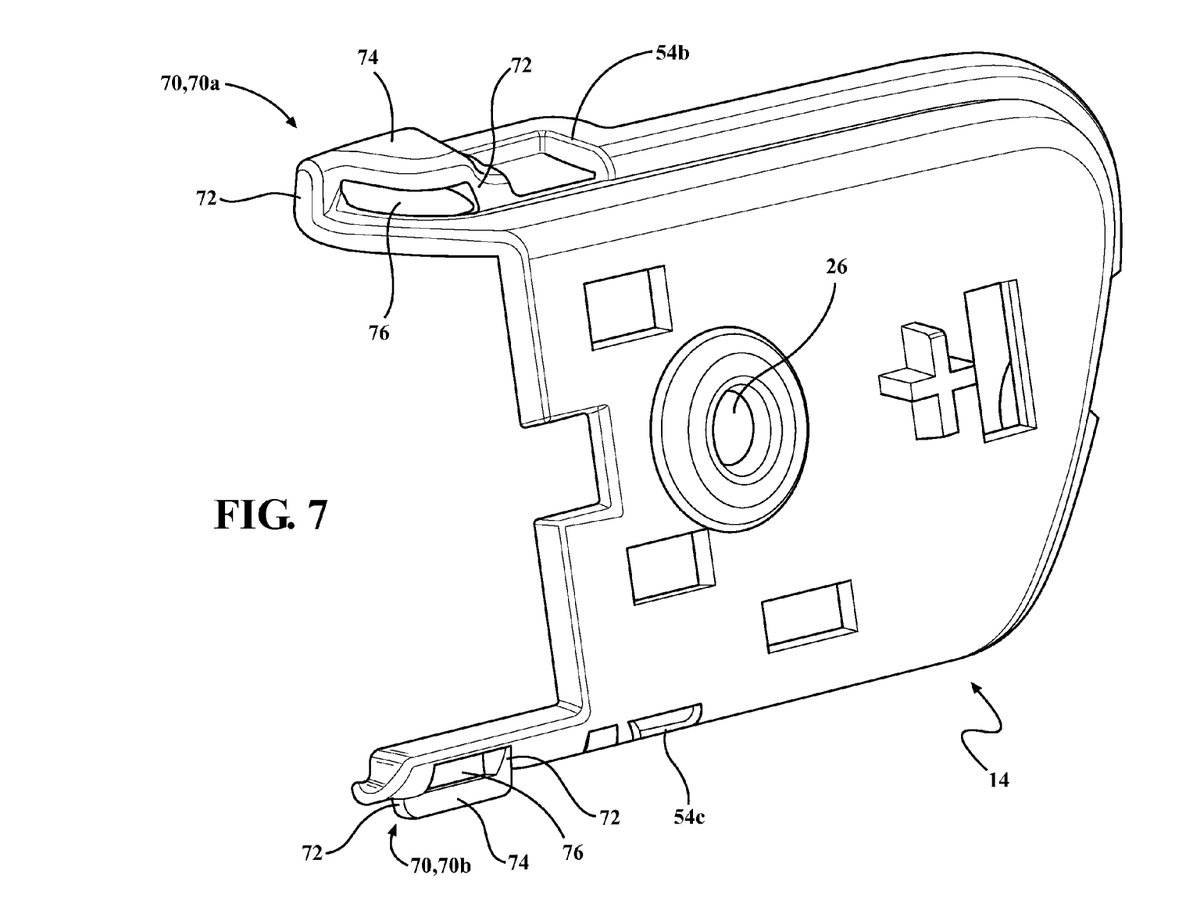
FIG. 7 is a view of the back side of the base.

With reference now to FIGS. 4, 5, and 7, an illustrative embodiment of the base 14 is provided. The base 14 has a handle support 20, a second wall 22, and an open side 24. The open side 24 defines an opening between the distal end 14a of the base 14 and the inner surface 16a of the first wall 16 of the trim piece 12 as shown in FIG. 5. The handle support 20 is a generally planar surface defining the depth of the space 18. The handle support 20 includes an attachment opening 26. The attachment opening 26 is configured to receive an attaching member 102 so as to attach the base to the vehicle body 300 as shown in FIG. 2. The door handle 100 is attached to the vehicle body 300 by attachment to a handle support 400 which is mounted to the vehicle body 300.

With reference again to FIG. 2, the door assembly includes an interior trim panel 200, the vehicle body 300, and an exterior trim panel (not shown). The interior trim panel 200 is visible from the cabin space of the automotive vehicle. The vehicle body 300 is a door frame which provides vehicle structure and is sandwiched between the interior trim panel 200 and the exterior panel. The vehicle door frame 300 may be formed of a durable and rigid material such as steel. The interior trim panel 200 may be formed of a polymer and manufactured by an injection molding process. The interior trim panel 200 may include a leather surface or may be processed to have a desired gloss.

With reference again to FIGS. 1, 2, 3, and 4, an illustrative view of the trim piece 12 is provided. The trim piece 12 may further include a flange 28 extending from a proximal edge of the first wall 16. The flange 28 is configured to be seated within an opening of the interior trim panel 200 of the door assembly. The flange 28 may have rounded corners and may fit within the opening of the interior trim panel 200 and flush with an outer surface of the interior trim panel 200 or may be slightly recessed with respect to an outer surface of the interior trim panel 200.

The first wall 16 may include a first side wall 30 spaced apart from a second side wall 32 and a front wall 34 interconnecting the first and second side walls 30, 32. As shown in FIGS. 1 and 2, when mounted to the door assembly, the first side wall 30 is elevated above the second side wall 32 and the front wall 34 is oriented towards the front of the vehicle. The back portion of the flange 28 of the trim piece 12 is generally planar.

The trim piece 12 includes at least two attachments 36, 38. Attachment 36 is configured to engage the interior trim panel 200. As shown in FIG. 5, an exemplary embodiment of attachment 36 is a pair of prongs 36a, 36b extending axially with respect to the length of the trim piece 12. The prongs 36a, 36b are spaced apart from each other and formed on an outer surface of the front wall 34 and project outwardly. The prongs 36a, 36b are configured to snap fit into a pair of respective recesses (not shown) formed in the interior trim panel 200.

The first and second side walls 30, 32 extend along a generally horizontal plane defined by axis "L" and "W" as referenced in FIG. 5. The front wall 34 is disposed along a generally horizontal plane defined by axis "H" and "W" as referenced in FIG. 4. The first and second side walls 30, 32 and the front wall 34 may be angled inwardly with respect to each other. Accordingly, the top opening of the housing assembly 10 has a larger area than the bottom area of the housing assembly 10, as shown in FIG. 2.

The first wall 16 has a first distal edge 40 defined by the exposed edge of the first and second side walls 30, 32 and the front wall 34. The distal edge 40 of the first and second side walls 30, 32 and the front wall 34 are not necessarily spaced evenly apart from the flange 28. Thus, the distal edge 40 may be contoured as needed for packaging considerations.

The trim piece 12 includes an attachment generally referenced by numeral 38, and specifically by 38 in an alphanumeric form, configured to attach the trim piece 12 to the base 14. Attachment 38 may be formed on the front wall 34 of the first wall 16 as shown in FIGS. 4 and 5. It should be appreciated that the shape and dimension of attachment 38 is provided for illustrative purposes and is not to be read as limiting the scope of the appended claims.

The trim piece 12 may include three attachments 38a, 38b, 38c. A pair of side attachments 38b, 38c are spaced apart from each other and formed on an outer surface of a respective first side wall 30 and second wall 32. The attachments 38 include a lip 42 extending outwardly from the first wall 16. A pair of ribs 44 is orthogonal to an undersurface of the lip 42 so as to provide structural support for the lip 42. The lip 42 of attachment 38b, 38c disposed on respective first and second side walls 30, 32 has a chamfered edge 46. The chamfered edge 46 is formed on a forward portion of the lip 42. For use herein "forward" references a position of the respective first and second side walls 30, 32 closest to the front wall 34. The chamfered edges 46 of the attachments 38 are angled such that a load orthogonal to the base causing tension on the attachments 38 will cause the front wall attachment 38a to release prior to the side wall attachments 38b, 38c. The trim piece 12 may further include additional ribs 44 or other reinforcement structure to provide structural stability to the lip 42.

Figure 8:
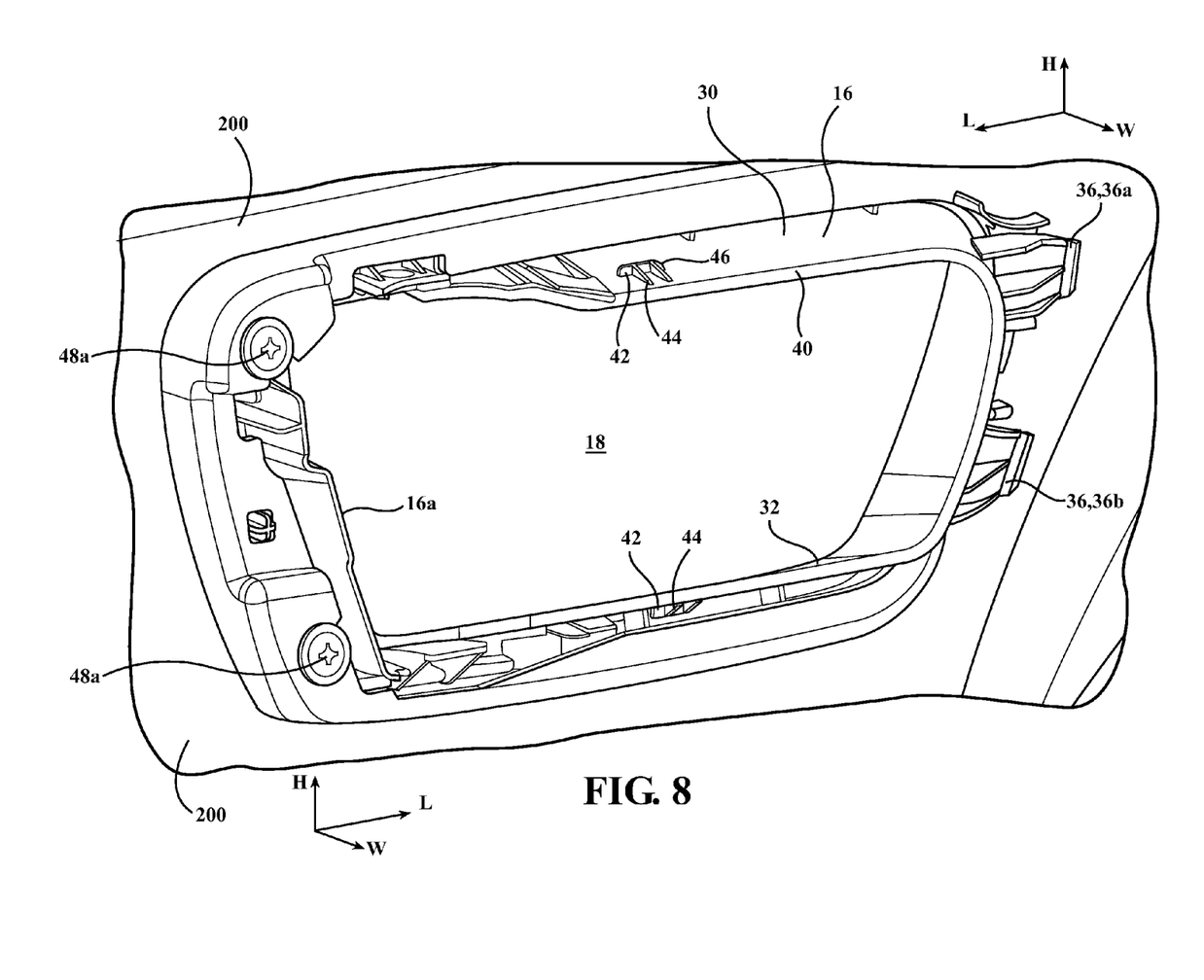
FIG. 8 is a view taken from the interior of the interior trim panel showing the trim piece mounted thereto.

With reference again to FIGS. 2 and 4, and now to FIG. 8, the trim piece 12 is mounted to the interior trim panel 200, wherein the flange 28 is disposed on an outer surface of the trim panel 200 and the first wall 16 extends through an opening of the interior trim panel 200 and hidden from view. The trim piece 12 may include a pair of annular threaded supports 48 configured to receive a threaded screw 48a so as to secure the trim piece 12 to the interior panel (shown in FIG. 8). As shown in FIG. 8, the screws are mounted to a hidden side of the interior trim panel 200. A back portion of the trim piece 12 is generally flush against the hidden surface of the interior trim panel 200.

Figure 6:
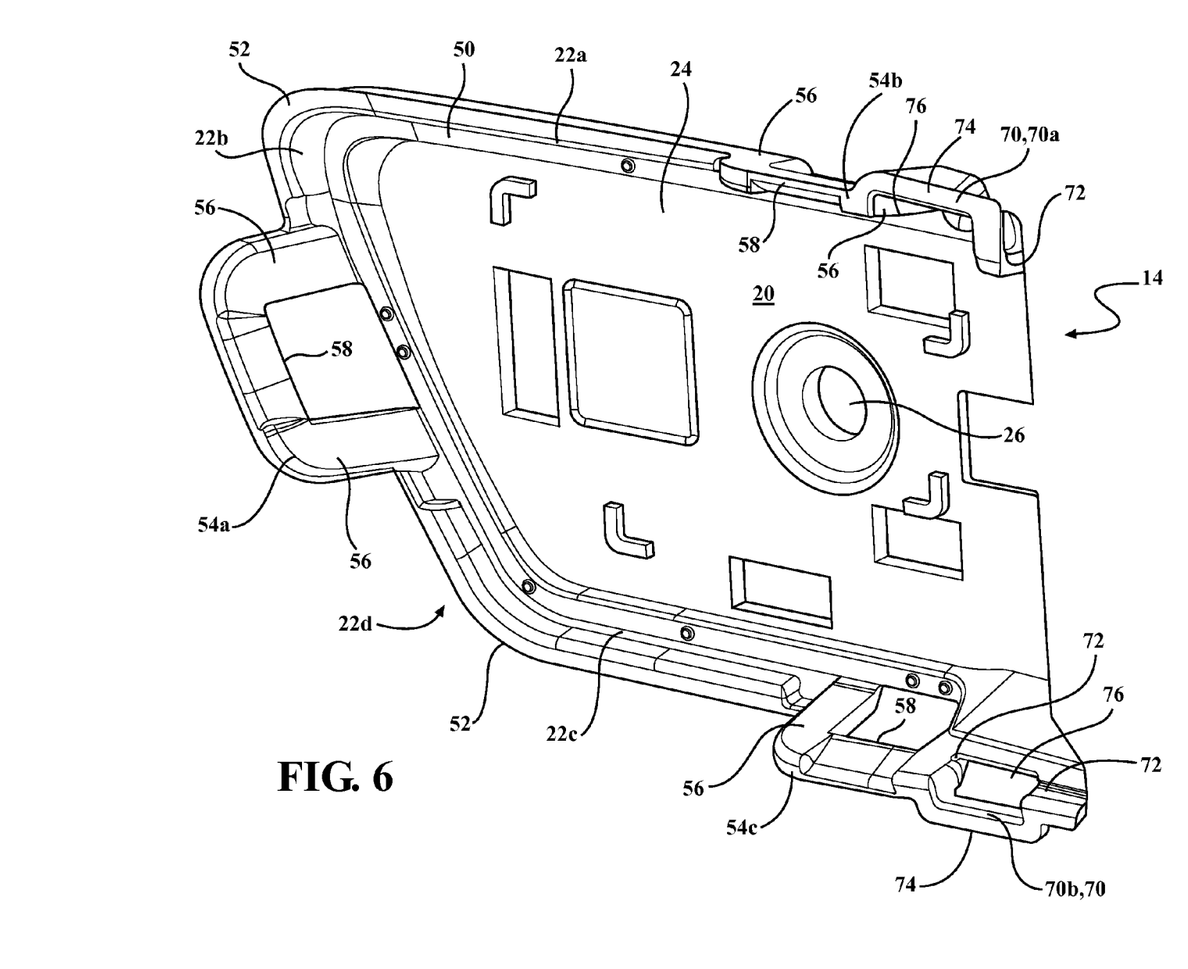
FIG. 6 is a perspective view of a first surface of the base.

With reference now to FIGS. 2, 5, 6, and 7, an illustrative embodiment of the base 14 is provided. The base 14 is mounted onto the first wall 16 of the trim piece 12 as shown in FIG. 5. With reference now to FIG. 6, a first side surface of the base 14 is provided. The handle support 20 includes a plurality of openings, some of which are shown as generally rectangular and are provided to allow for packaging of components typically found within the door assembly and associated with the handle. One of the openings is the attachment opening 26 which is formed adjacent the open side 24 of the base 14. The attachment opening 26 may be generally recessed with respect to the handle support 20. Specifically, attachment opening 26 may be recessed with respect to a first side surface of the handle support 20. As shown in FIG. 7, the attachment opening 26 protrudes from a second side surface of the handle support 20.

The second wall 22 extends outwardly with respect to the first side surface and may include a ledge 50. The ledge 50 extends along an inner wall surface of the top side 22a, front side 22b, and bottom side 22c of the second wall 22 and defines an upper wall portion 22d.

The second wall 22 includes a distal edge 52. The base 14 includes three attachments generally referenced as 54, and individually as an alphanumeric designated by 54 and a respective letter. The attachments 54 are dimensioned to receive a respective attachment 38 of the trim piece 12.

The attachments 54 are generally configured to function as a snap fit engagement with attachment 38. In an illustrative embodiment of such a snap fit engagement, attachment 54 includes a pair of legs 56 and an elongated catch 58 extending between the distal ends of the spaced apart legs 56. The elongated catch 58 has a contact surface extending along an axis and configured to engage the lip 42 of a respective attachment feature of the trim piece 12 so as to retain the trim piece 12 to the base 14.

As shown in FIG. 5, the attachment 54a is engaged with the front side attachment 38a of the trim piece 12 wherein the elongated catch 58 is substantially aligned with the entire top surface of the lip 42. The side attachment 54b, 54c has an elongated catch 58 dimensioned such that a forward portion of the elongated catch 58 is free of the lip 42. Specifically, the chamfered edge 46 of the lips 42b, 42c (shown in FIG. 4) provides minimal contact so as to support and facilitate the detachment of the trim piece 12 with respect to the base 14 along axis labeled "W."

The attachments 54 and 38 work together to press the distal edge 40 of the trim piece 12 and the distal edge 52 of the second wall 22 of the base 14 against each other, as shown in FIG. 2, so as to form a housing for holding the handle. The distal edge 40 of the trim piece 12 and the distal edge 52 of the second wall 22 of the base 14 are dimensioned to abut against each other so as to form a part line 60, as shown in FIG. 2. The part line 60 may be visible.

With reference now to FIGS. 1, 2, and 3, the housing assembly 10 may further include an insert 62. The insert 62 has a generally planar cover surface 64. The peripheral edges of the cover surface 64 include a raised edge 66. The raised edge 66 extends outwardly along axis "W" so as to cover the part line 61 when the insert 62 is mounted to the housing assembly 10, as shown in FIG. 2.

The trim piece 12 may further include a pair of spacers 68. The spacers 68 extend outwardly from an inner surface of the trim piece 12. The spacers 68 are formed along a back edge portion of the trim piece 12 and have a length sufficient to maintain the spatial relationship between the first and second side walls 30, 32 so as to clear the distal edge 40 of the trim piece 12 from the raised inner edge 66 of the insert 62 when the trim piece 12 is translated away from the base 14 along the "W" axis.

The base 14 may further include a pair of cages 70. The cages 70 have a pair of legs 72 and a top wall 74 extending between the legs 72. The top wall 74 includes an elongated surface so as to define a slot 76. The slot 76 is configured to help maintain contact with a respective spacer 68 wherein displacement of the spacers 68 away from the slot 76 along the "W" direction maintains the spatial relationship of the first and second side walls 30, 32 along the "L" axis so as to prevent the first and second side walls 30, 32 from being squeezed relative to each other in the event that the interior trim panel 200 is displaced with respect to the vehicle body 300.

It should be appreciated that the dimensions of the cage 70 may be modified based upon packaging considerations. Thus, as shown in FIG. 6, the cages 70 are not identical to each other. A top cage 70a has a width which is wider than the bottom cage 70b. A distal edge of the top cage 70a is slanted whereas a distal edge of the bottom cage 70b is generally parallel to the planar surface of the handle support 20. The spacers 68 may further include a pair of ramp shaped stops 78, as shown in FIG. 2. The ramp shaped stops 78 are configured to engage a distal edge 52 of the second wall 22 of the base 14 so as to limit the depth at which the spacers 70 are inserted into a respective slot 76.

The invention is not limited to the embodiments, examples, etc. disclosed above. It is appreciated that changes, modifications, etc. can be made by one skilled in the art and still fall within the scope of the invention. As such, the scope of the invention is defined by the claims and all equivalents thereof.

We claim:

1. A housing assembly configured to house a door handle mounted to a vehicle, a portion of the housing assembly further configured to attach to an interior trim panel of a door assembly, the housing assembly comprising:
    a trim piece having a first wall bounding a space configured to hold the door handle, the trim piece having at least two attachments, wherein one of the attachments is configured to engage the interior trim panel;
    a base having a handle support, a second wall and an open side, the handle support having a planar surface and an opening for receiving a portion of the door handle, the base including at least one attachment configured to engage the trim piece, wherein the trim piece attachment to the trim piece is weaker than the attachment of the trim piece to the interior panel so as to allow the trim piece to separate from the base before the trim piece separates from the interior trim panel.

2. The housing assembly as set forth in claim 1, wherein the first wall includes a first side wall spaced apart from a second side wall, and a front wall interconnecting the first and second side walls, the first and second side walls extending generally axially along a horizontal plane.

3. The housing assembly as set forth in claim 2, wherein the at least two attachments is three attachments, wherein two of the attachments are formed on a respective first side wall and a second side wall and the third attachment is formed on a front wall, the base having three attachments each mounted on the second wall and configured to engage a respective attachment of the trim piece.

4. The housing assembly as set forth in claim 3, wherein each of the three attachments include a lip extending outwardly from a respective first and second side walls and front wall, wherein the lips on the first and second side walls have a chamfered edge, the chamfered edge facing the front wall, and wherein each of the three attachments on the base are a cage having a generally elongated catch, the cage is resilient and configured to overcome the respective lips so as to engage the elongated catch with a respective lip.

5. The housing assembly as set forth in claim 2, wherein the first and second side walls and the front wall are angled inwardly with respect to each other.

6. The housing assembly as set forth in claim 5, wherein the first wall includes a first distal edge, and the second wall includes a second distal edge, wherein the first and second distal edges are aligned with each other.

7. A housing assembly configured to house a door handle mounted to a vehicle, a portion of the housing assembly further configured to attach to an interior trim panel of a door assembly, the housing assembly comprising:
    a trim piece having a first wall bounding a space configured to hold the door handle, the trim piece having a pair of spacers, each of the spacers is opposite the other;
    a base having a handle support, a second wall and an open side, the handle support having a planar surface and an opening for receiving a portion of the door handle, and a pair of cages, each of the pair of cages configured to receive a respective spacer, the spacers maintaining the spatial relationship between the first and second side walls for a predetermined distance; and
    an insert mounted over the base, the insert configured to cover the open side and the base.

8. The housing assembly as set forth in claim 7, wherein the first wall includes a first distal edge, and the second wall includes a second distal edge, wherein the first and second distal edges are aligned with each other so as to form a part line, the insert having a raised edge configured to cover the part line.

9. The housing assembly as set forth in claim 7, wherein one of the pair of spacers is disposed on a first side wall of the first wall, and the other of the pair of spacers is disposed on a second side wall of the second wall.

10. The housing assembly as set forth in claim 9, wherein each of the pair of cages is disposed at the open side of the base.

11. The housing assembly as set forth in claim 10, wherein the cages include a pair of legs, and a top wall so as to define a slot, the top wall having a length generally the same length as a corresponding spacer.

12. The housing assembly as set forth in claim 11, wherein each of the spacers have an inner surface, the inner surface engaging an outer surface of the second wall.

\* \* \* \* \*